United States Patent
Ota

(10) Patent No.: US 9,524,026 B2
(45) Date of Patent: Dec. 20, 2016

(54) PORTABLE APPARATUS, CONTROL METHOD AND PROGRAM

(71) Applicant: CANON KABUSHIKI KAISHA, Tokyo (JP)

(72) Inventor: Tomohiro Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/639,881

(22) Filed: Mar. 5, 2015

(65) Prior Publication Data

US 2015/0253852 A1    Sep. 10, 2015

(30) Foreign Application Priority Data

Mar. 7, 2014    (JP) ................................ 2014-045524

(51) Int. Cl.
| | |
|---|---|
| G06F 3/01 | (2006.01) |
| H04L 12/58 | (2006.01) |
| G06F 3/0484 | (2013.01) |
| H04M 19/04 | (2006.01) |

(52) U.S. Cl.
CPC ........... *G06F 3/016* (2013.01); *G06F 3/04842* (2013.01); *H04L 51/24* (2013.01); *H04M 19/047* (2013.01); *H04M 2250/22* (2013.01)

(58) Field of Classification Search
CPC ..... G06F 3/016; H04L 51/24; H04M 2250/22; H04M 19/047

USPC .............................. 455/415, 418, 419, 550.1
See application file for complete search history.

(56) References Cited

U.S. PATENT DOCUMENTS

2009/0124296 A1* 5/2009 Tanae ................... H04M 19/04
                                                               455/567

FOREIGN PATENT DOCUMENTS

| JP | 2010-136151 A | 6/2010 |
|---|---|---|
| JP | 2011-48697 A | 3/2011 |

* cited by examiner

*Primary Examiner* — Sam Bhattacharya
(74) *Attorney, Agent, or Firm* — Canon USA, Inc. IP Division

(57) ABSTRACT

A portable apparatus includes a determination unit, a first notification unit, a second notification unit, and a control unit. The determination unit determines whether there occurs an event which is to be notified to a user. The first notification unit notifies the event to the user by a first method that gives a tactile sensation to an operation element via an input surface. The second notification unit notifies the event to the user in accordance with a second method that is different from the first method. The control unit causes a notification unit to give a notification. Where the input surface is in a contact state when the event occurs, the control unit performs control to cause the first notification unit to give a notification. Where the input surface is in a not-touched state when the event occurs, the control unit causes the second notification unit to give a notification.

11 Claims, 3 Drawing Sheets

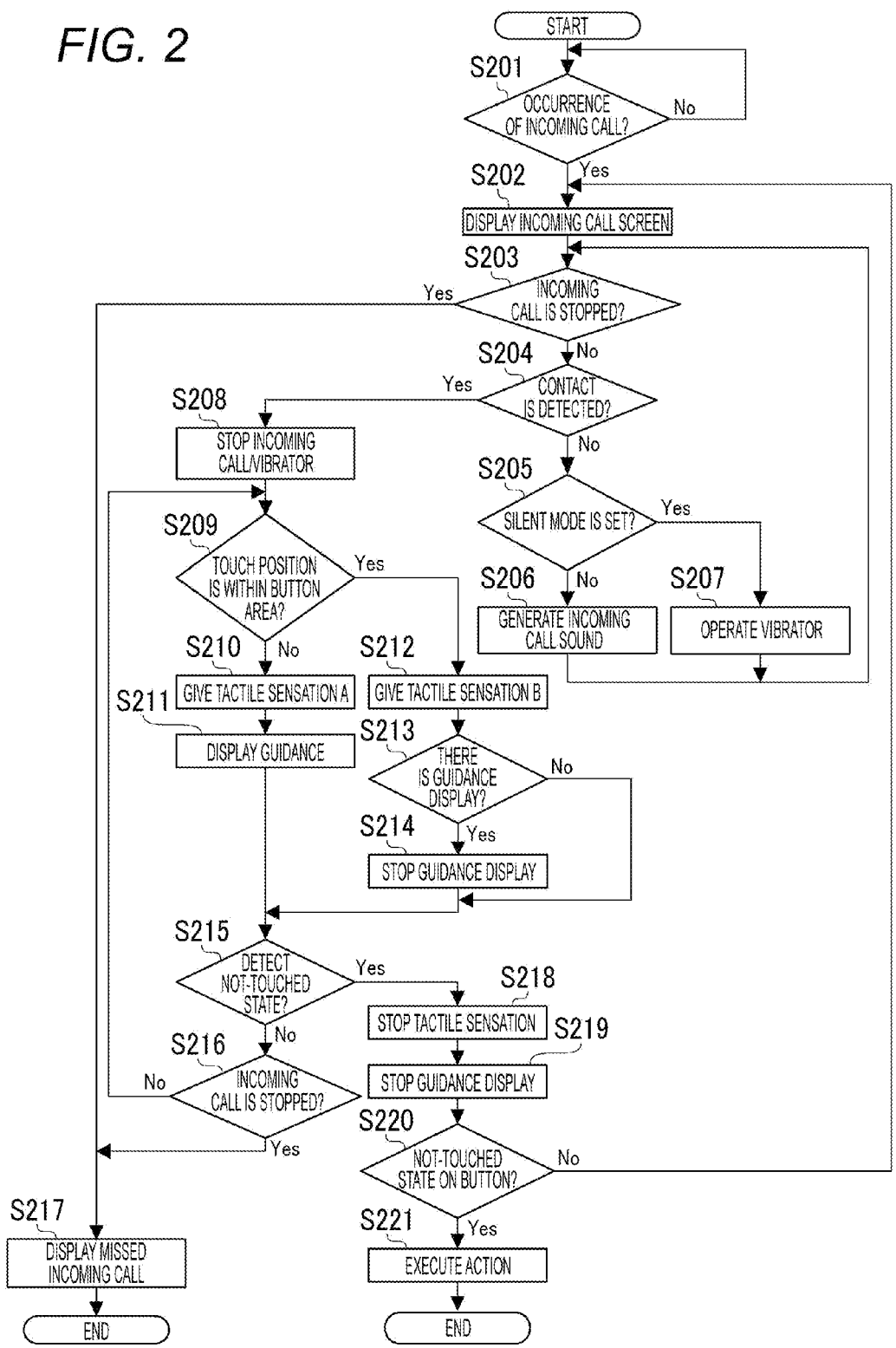

PORTABLE APPARATUS, CONTROL METHOD AND PROGRAM

BACKGROUND OF THE INVENTION

Field of the Invention

The present invention relates to a portable apparatus, a control method, and a program.

Description of the Related Art

It is common for a conventional cellular phone to notify a user of an incoming call or an alarm by using sound, vibration, or light emission such as a screen and an LED.

On the other hand, most of recent cellular phones use touch panels as a user interface. A cellular phone having a function of presenting a tactile sensation to a user when the user touches is also known. For example, Japanese Patent Application Laid-Open No. 2011-48697 and Japanese Patent Application Laid-Open No. 2010-136151 disclose techniques for presenting an event that occurred within an apparatus by using a tactile sensation when a user touches on a touch panel.

However, in many cases, an incoming call sound or an alarm sound of a cellular phone often occurs in, e.g., a location where noises should be avoided. In a cellular phone, no-sound may be set in the silent mode and the like, but in an extremely quiet location, the sound of the vibration operation may also be a noise. In a dark environment such as a movie theater, light emission of a display screen and an LED of a cellular phone may be annoying to people around the user.

SUMMARY OF THE INVENTION

An aspect of the present invention is to solve all of or at least one of the above problems.

According to an aspect of the present invention, a portable apparatus includes a determination unit configured to determine whether there occurs an event which is to be notified to a user a first notification unit configured to notify the event to the user by a first method that gives a tactile sensation to an operation element via an input surface a second notification unit configured to notify the event to the user in accordance with a second method that is different from the first method used by the first notification unit and a control unit configured to cause a notification unit to give a notification, wherein, in a case where the input surface is in a contact state when the event occurs, the control unit performs control to cause the first notification unit to give a notification, and wherein, in a case where the input surface is in a not-touched state when the event occurs, the control unit performs control to cause the second notification unit to give a notification.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating tactile sensation control processing.

DESCRIPTION OF THE EMBODIMENTS

Various exemplary embodiments, features, and aspects of the invention will be described in detail below with reference to the drawings.

Hereinafter, an embodiment of the present invention will be explained with reference to drawings.

Figure 1:
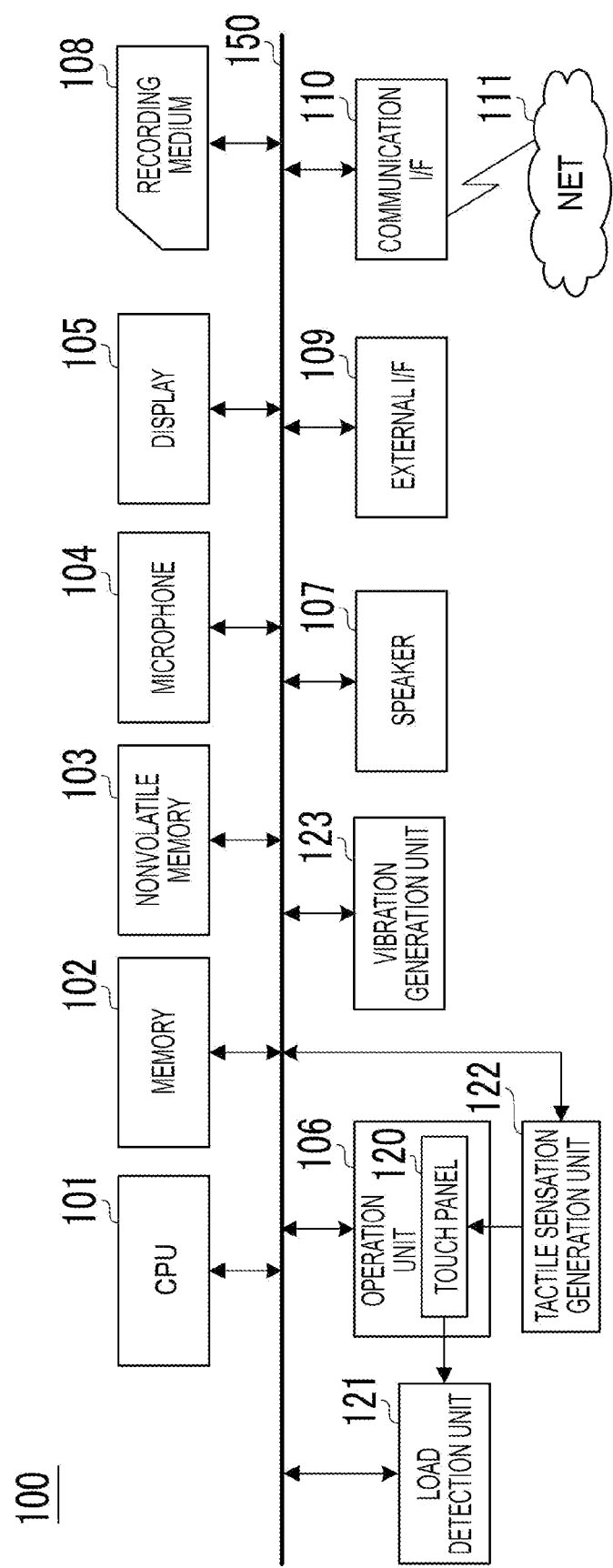
FIG. 1 is a figure illustrating a cellular phone.

FIG. 1 is a figure illustrating a cellular phone 100 serving as a portable apparatus. As shown in FIG. 1, a CPU 101, a memory 102, a nonvolatile memory 103, a microphone 104, a display 105, an operation unit 106, a speaker 107, a recording medium 108 such as a detachable memory card, an external I/F 109, and a communication I/F 110 are connected to an internal bus 150. In addition, a tactile sensation generation unit 122 and a vibration generation unit 123 are connected to the internal bus 150. Each unit connected to the internal bus 150 can exchange data with each other via the internal bus 150.

The memory 102 has, for example, a RAM (such as a volatile memory using a semiconductor device). For example, the CPU 101 controls each unit of the cellular phone 100 by using a work memory of the memory 102 in accordance with a program stored in the nonvolatile memory 103. The nonvolatile memory 103 stores image data, sound/speech data, other data, various kinds of programs for allowing the CPU 101 to operate, and the like. The nonvolatile memory 103 includes, for example, a hard disk (HD), a ROM, and the like.

The microphone 104 collects sound such as sound/speech during communication on the basis of the control of the CPU 101. The microphone 104 may include a sound/speech signal processing unit that performs A/D conversion on a sound/speech waveform signal into digital data, and that performs frequency filtering, noise cancelling, and the like. The obtained sound/speech signal is buffered to the memory 102 on the basis of the control of the CPU 101, and thereafter, is given to the control of each unit.

The display 105 displays a graphical user interface (GUI) screen and the like constituting an image and a GUI on the basis of the control of the CPU 101. The CPU 101 controls each unit of the cellular phone 100 so as to generate a display control signal according to the program, generate a video signal to be displayed on the display 105, and output this to the display 105. Then, the display 105 displays a video on the basis of a video signal. The display 105 is an example of a display screen.

In another example, the cellular phone 100 may not have the display 105, and may have an interface for outputting a video signal to be displayed on the display 105. In this case, it is considered that the cellular phone 100 displays an image and the like on an externally attached monitor (a television set and the like).

The operation unit 106 is an input device for receiving user operation, for example, a character information input device such as a keyboard, a pointing device such as a mouse and a touch panel 120, a button, a dial, a joy stick, a touch sensor, a touch pad, and the like. The touch panel 120 is configured in a flat manner to overlap the display 105, and an input device outputting coordinate information according to a contact position. The touch panel 120 is an example of an input surface.

The speaker 107 outputs a digital sound/speech signal buffered in the memory 102 to the outside as sound/speech on the basis of the control of the CPU 101. The digital sound/speech signal which is output by the speaker 107 may be a signal obtained by the microphone 104, a signal obtained via the external I/F 109 and the communication I/F 110, a signal obtained from the nonvolatile memory 103, and the like. The speaker 107 may include a sound/speech signal processing unit performing various kinds of filtering and conversion processing on the digital sound/speech.

In another example, the cellular phone 100 may not have the speaker 107, and may include an interface for outputting a sound/speech signal to be output from the speaker 107. In this case, the cellular phone 100 outputs sound/speech to an externally-attached speaker or earphone.

In addition, an LED, not shown, is provided, and the LED notifies the user of an incoming call by emitting light when the incoming call is received.

The external I/F 109 is an interface connected to an external device via a cable or wirelessly to input/output a video signal and a sound/speech signal. The communication I/F 110 is an interface that communicates with an external device, the Internet 111, and the like (including telephone communication), and transmits and receives sound/speech signals and various kinds of data such as a file and a command.

The CPU 101 receives coordinate information about a touch position that is output from the touch panel 120 via the internal bus 150. The CPU 101 detects the following operation and state on the basis of the coordinate information.

Operation of touching the touch panel 120 with a finger or a pen (hereinafter referred to as touch).

State in which the touch panel 120 is touched with a finger or a pen (hereinafter referred to as contacting).

Operation for moving a finger or a pen while the touch panel 120 is touched with the finger or the pen (hereinafter referred to as move).

Operation for releasing the finger or the pen that was in contact with the touch panel 120 (hereinafter referred to as release).

State in which nothing is in contact with the touch panel 120 (hereinafter referred to as not touched).

When the CPU 101 further detects movement, the CPU 101 determines movement direction of the finger or the pen on the basis of coordinate change of the touch position. More specifically, the CPU 101 determines each of the vertical component and the horizontal component of the movement direction on the touch panel 120.

The CPU 101 also detects each of the operations of a stroke, a flick, and a drag. When a release is performed upon a certain movement after a touch, the CPU 101 detects a stroke. When a move for a distance equal to or more than a predetermined distance and at a speed equal to or more than a predetermined speed is detected, and subsequently a release is detected, the CPU 101 detects a flick. When a move for a distance equal to or more than a predetermined distance and at a speed less than a predetermined speed is detected, the CPU 101 detects a drag.

It should be noted that the flick is an operation for quickly moving the finger for a certain distance while the finger is in contact with the touch panel 120, and then releasing the finger from the touch panel 120 as it is. More specifically, the flick is the operation for quickly tracing with the finger on the touch panel 120 like as if flipping the finger.

The touch panel 120 may use any one of touch panels of various methods such as a resistive film method, an electrostatic capacitive method, a surface acoustic wave method, an infrared method, an electromagnetic induction method, an image recognition method, and a light sensor method.

A load detection unit 121 is integrally provided with the touch panel 120 with an adhesive and the like. The load detection unit 121 is a strain gauge sensor, and detects a load (pressing force) applied to the touch panel 120 by making use of a very small amount of warping (distortion) of the touch panel 120 according to pressing force of touch operation. In another example, the load detection unit 121 may be provided integrally with the display 105. In this case, the load detection unit 121 detects the load applied to the touch panel 120 via the display 105.

The tactile sensation generation unit 122 generates tactile sensation given to an operation element such as a finger and a pen with which the touch panel 120 is operated. The tactile sensation generation unit 122 is integrally provided with the touch panel 120 with an adhesive and the like. The tactile sensation generation unit 122 is a piezoelectric (piezo) device, and more specifically, the tactile sensation generation unit 122 is a piezoelectric vibration element vibrating with any given amplitude and frequency under the control of the CPU 101. Accordingly, the touch panel 120 bends and vibrates, and the vibration of the touch panel 120 is transmitted to the operation element as a tactile sensation. More specifically, the tactile sensation generation unit 122 is configured to vibrate by itself, and give a tactile sensation to the operation element.

In another example, the tactile sensation generation unit 122 may be provided integrally with the display 105. In this case, the tactile sensation generation unit 122 bends and vibrates the touch panel 120 via the display 105.

It should be noted that the CPU 101 changes the amplitude and the frequency of the tactile sensation generation unit 122, and vibrates the tactile sensation generation unit 122 in various patterns, thus tactile sensations of various patterns such as smooth tactile sensation and bumpy tactile sensation can be generated.

The CPU 101 can control the tactile sensation on the basis of a touch position detected by the touch panel 120 and a pressing force detected by the load detection unit 121. For example, it is assumed that, in association with the touch operation of the operation element, the CPU 101 detects a touch position corresponding to a button icon displayed on the display 105, and the load detection unit 121 detects a pressing force equal to or more than a predetermined value. In this case, the CPU 101 generates vibration of about one cycle. Therefore, the user can perceive a tactile sensation such as a click feeling as if pressing a mechanical button.

Further, it is assumed that, only when the CPU 101 detects a pressing force equal to or more than a predetermined value while the CPU 101 detects a touch to a position of a button icon, the CPU 101 executes the function of the button icon. More specifically, when the CPU 101 detects a weak pressing force such as a pressing force that occurs when a user simply touches a button icon, the CPU 101 does not execute the function of the button icon. Therefore, the user can perform operation with a sensation similar to that experienced when the user presses a mechanical button.

It should be noted that the load detection unit 121 is not limited to a strain gauge sensor. In another example, the load detection unit 121 may have a piezoelectric device. In this case, the load detection unit 121 detects a load on the basis of a voltage that is output from the piezoelectric device in accordance with a pressing force. Further, the pressure device serving as the load detection unit 121 in this case may be common to the pressure device serving as the tactile sensation generation unit 122.

The tactile sensation generation unit 122 is not limited to the unit generating vibration with the pressure device. In another example, the tactile sensation generation unit 122 may be a unit that generates an electric tactile sensation. For example, the tactile sensation generation unit 122 includes a conductive layer panel and an insulating body panel. In this case, like the touch panel 120, the conductive layer panel and the insulating body panel is caused to overlap the display 105, and are disposed in a planar manner. Then, when the user touches the insulating body panel, positive electric charge is charged to the conductive layer panel. More specifically, the tactile sensation generation unit 122 charges positive electric charge to the conductive layer panel, so that a tactile sensation serving as an electric stimulation can be generated. The tactile sensation generation unit 122 may also be configured to give a user such sensation that a skin is pulled by Coulomb force (tactile sensation).

In another example, the tactile sensation generation unit 122 may have a conductive layer panel capable of selecting, at each position of the panel, whether positive electric charge is charged or not. Then, the CPU 101 controls the charge position of the positive electric charge. Accordingly, the tactile sensation generation unit 122 can give the user various kinds of tactile sensations such as "bumpy sensation," "rough sensation," "smooth sensation," and the like.

In another example, the tactile sensation generation unit 122 may generate a tactile sensation by vibrating the surface of the touch panel 120 with ultrasonic wave. With the ultrasonic wave vibration, a high pressure air film is formed between the touch panel 120 and the finger. Therefore, the tactile sensation generation unit 122 may give "slippery sensation" using this floating action of the air film, and may give "rough sensation" by instantly switching the magnitude of the floating action.

The vibration generation unit 123 generates tactile sensation by vibrating the entire cellular phone 100. The vibration generation unit 123 includes, for example, an eccentric motor and the like, and achieves a publicly-known vibration function and the like. Therefore, the cellular phone 100 can give tactile sensation to, e.g., a hand of the user who holds the cellular phone 100 by using the vibration generated by the vibration generation unit 123.

FIG. 2 is a flowchart illustrating tactile sensation control processing performed by the cellular phone 100. It should be noted that the tactile sensation control processing is achieved by causing the CPU 101 to read a program stored in the nonvolatile memory 103 and execute this program. In step 201, the CPU 101 determines whether there occurs an event of an incoming call of a call request from the Internet 111 via the communication I/F 110 (determination processing). When the CPU 101 determines that there occurs an incoming call (Yes in S201), the CPU 101 subsequently performs the processing in S202. When the CPU 101 determines that there does not occur an incoming call (No in S201), the CPU 101 maintains waiting state.

Figure 3A:
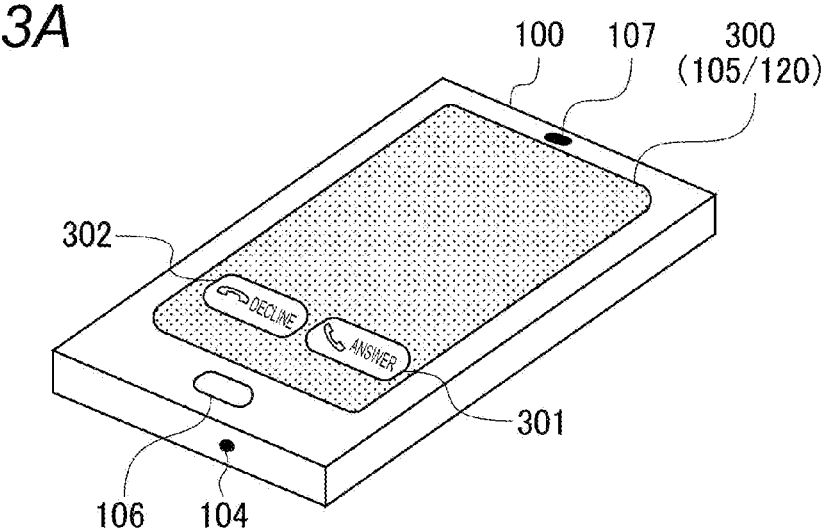
FIGS. 3A, 3B, and 3C are figures illustrating an example of an incoming call screen.

In S202, the CPU 101 displays an incoming call screen on the display 105, and causes an LED, not shown, to emit light. FIG. 3A is a figure illustrating an example of the incoming call screen. An answer button 301 and a decline button 302 are displayed in the incoming call screen 300. The answer button 301 and the decline button 302 are icons for receiving instructions for answering and declining the incoming call, respectively. Both of the answer button 301 and the decline button 302 are buttons displayed on the display 105 serving as the display screen, and are examples of buttons for receiving instructions for the incoming call serving as an event.

When the cellular phone 100 detects that the user touches on the touch panel 120 with the operation element and thereafter detects that the user performs operation to release touching in a button area (response area) corresponding to the answer button 301 or the decline button 302, the cellular phone 100 receives a selection instruction of the buttons 301, 302. The button area of each of the buttons 301, 302 is a range that is set in advance in accordance with the external shape of the display of the buttons 301, 302. For example, the button area is an area larger by a certain amount than the external shape of the display of the buttons 301, 302.

Back to FIG. 2, in S203, the CPU 101 determines whether an incoming call that occurred in S201 is stopped or not. When the CPU 101 determines that the incoming call is stopped (Yes in S203), the CPU 101 subsequently performs the processing in S217. On the other hand, the CPU 101 determines that the incoming call is not stopped (No in S203), the CPU 101 subsequently performs the processing in S204. In S204, the CPU 101 determines whether contact of the operation element such as a finger of the user is detected on the touch panel 120 during an incoming call. When the CPU 101 detects contact (Yes in S204), the CPU 101 subsequently performs the processing in S208. When the CPU 101 does not detect contact (No in S204), the CPU 101 subsequently performs the processing in S205.

In S205, the CPU 101 determines whether the cellular phone 100 is set in the silent mode or not. In this case, the silent mode is a mode for notifying the user by using vibration instead of an incoming call sound and the like in order to abruptly generate the incoming call sound or alarm in a public place and the like. When a silent mode is set on a setting menu screen displayed on the display 105, the CPU 101 stores setting contents to the memory 102 or the nonvolatile memory 103. Then, the CPU 101 sets the silent mode by successively reading the setting content and switching the control.

When the CPU 101 determines that the cellular phone 100 is set in the silent mode (Yes in S205), the CPU 101 subsequently performs the processing in S207. When the CPU 101 determines that the cellular phone 100 is not set in the silent mode (No in S205), the CPU 101 subsequently performs the processing in S206. In S206, the CPU 101 notifies the user of an occurrence of an event of an incoming call by outputting an incoming call sound (sound/speech output processing). More specifically, the CPU 101 reads incoming call sound source data from the nonvolatile memory 103, and generates an incoming call sound by controlling the speaker 107 on the basis of read data. After the processing in S206, the CPU 101 subsequently performs the processing in S203. In S207, the CPU 101 notifies the user of an occurrence of an event of an incoming call by operating vibrator (vibration processing) instead of the incoming call sound. More specifically, the CPU 101 controls the vibration generation unit 123 so that the entire cellular phone 100 vibrates. After the processing in S207, the CPU 101 subsequently performs the processing in S203. In this case, the processing in S206 and S207 is an example of second notification processing for notifying the user of an event. The processing in S204, S206, and S207 is an example of control processing for performing controlling so as to notify the user by using the incoming call sound or the vibrator in a case of not-touched state in a case where an event occurs.

In S208, the CPU 101 stops the incoming call sound started in S206 or the vibrator operation started in S207. Therefore, the user can stop the incoming call sound and the vibration by groping for the cellular phone 100 while the cellular phone 100 is still in a bag or in a pocket without the user visually confirming the display 105. Further, in S208, the CPU 101 may also stop light emission of the display 105 and the LED, not shown. Therefore, the user can stop the light emission of the display 105 by groping for the cellular phone 100.

Subsequently, in S209, the CPU 101 determines whether the touch position is within a button area or not. When the CPU 101 determines that the touch position is within the button area (No in S209), the CPU 101 subsequently performs the processing in S210. On the other hand, when the CPU 101 determines that the touch position is out of the button area (Yes in S209), the CPU 101 subsequently performs the processing in S212.

In S210, the CPU 101 controls the tactile sensation generation unit 122 for notifying the user of an occurrence of an event of an incoming call by giving a tactile sensation A to the operation element. In this case, the tactile sensation A is used instead of the incoming call sound that is output in S206 and the vibrator operated in S207, and is to notify the user of an occurrence of an event of an incoming call. The tactile sensation A is preferably, for example, a tactile sensation for guiding the user to bring the operation element to a button. More specifically, on the basis of the button position and the touch position, the CPU 101 causes the tactile sensation generation unit 122 to increase the tactile sensation intensity in a case where the CPU 101 detects drag in a direction away from the button, and decreases the tactile sensation intensity in a case where the CPU 101 detects drag in a direction closer to the button. Therefore, the CPU 101 can give a tactile sensation to guide the operation element to the button. With the processing in S210, the user can recognize that the event of the incoming call continues even after the incoming call sound and the vibrator are stopped. Further, with the processing in S210, the operation element can be guided to the button.

It should be noted that the tactile sensation A is not limited to the embodiment. On the basis of the button position and the touch position, the CPU 101 may change the type of the tactile sensation such as "bumpy sensation" and "rough sensation" in addition to changing the tactile sensation intensity or instead of changing the tactile sensation intensity. Alternatively, for example, when a drag in a direction away from the button is detected, the tactile sensation intensity may be weakened, and when a drag in a direction closer to the button is detected, the tactile sensation intensity may be strengthened. Further, instead of controlling the intensity of the tactile sensation in accordance with the distance between the button and the touch position, the time interval of intermittent tactile sensation presentation may be changed in accordance with the distance between the button and the touch position.

The tactile sensation generation unit 122 may move the vibration position on the display so as to indicate the direction of the button position.

Figure 3B:
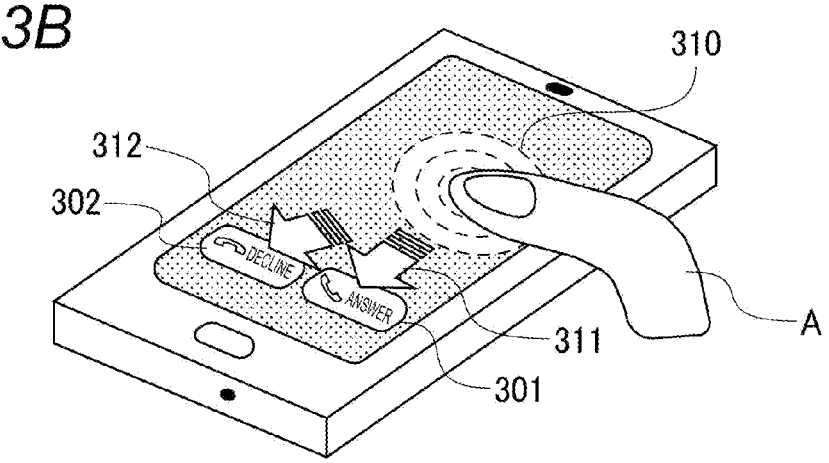

Subsequently, in S211, the CPU 101 displays a guidance display for guiding dragging to the button on the display 105 (display processing). FIG. 3B is a figure illustrating an example of a guidance display. When contact of the operation element A is detected, the CPU 101 displays a touch display 310 indicating a touch position. The touch display 310 is a display element for emphasizing the touch position. The CPU 101 preferably displays the touch display 310 with animation from the viewpoint of giving strong impression to the user.

The guidance displays 311, 312 are display elements for guiding the operation element to the buttons 301, 302. The guidance displays 311, 312 as shown in FIG. 3B are icons in an arrow shape. The CPU 101 preferably changes the display mode according to the touch position, e.g., the CPU 101 changes the length and the direction of the arrows of the guidance displays 311, 312 according to the touch position. With the processing in S212, the operation element can be guided to dragging.

On the other hand, in S212, the CPU 101 notifies the user of an occurrence of an event of an incoming call by giving a tactile sensation B to the operation element. In this case, the tactile sensation B is to give a tactile sensation, which is different from the tactile sensation A, to the operation element. Therefore, the cellular phone 100 uses a tactile sensation to allow the user to recognize what kind of processing the cellular phone 100 performs when the user is not touched in response to the tactile sensation. It should be noted that the tactile sensation B is, more specifically, a tactile sensation of which at least one of the intensity of the tactile sensation and the type of the tactile sensation is different from those of the tactile sensation A.

Further, the tactile sensation B may be different for each of types of the buttons. For example, when the touch position is within the button area of the answer button 301, the CPU 101 gives a tactile sensation B1, and when the touch position is within a button area of the decline button 302, the CPU 101 gives a tactile sensation B2 which is different from the tactile sensation B1.

In this case, the processing in S208 to S212 is an example of control processing for performing control to notify the user by generating a tactile sensation given to the operation element in a case of a contact state in a case where an event occurs.

As described above, when the cellular phone 100 detects contact, the cellular phone 100 can stop, e.g., output of an incoming call sound, and generate a tactile sensation. Therefore, the user of the cellular phone 100 can stop the output of the incoming call sound by groping for the cellular phone 100 and contacting the cellular phone 100 while the cellular phone 100 is still in a bag and the like.

Subsequently, in S213, the CPU 101 checks presence/absence of the guidance display. When the guidance display is displayed on the display 105 when the processing in S213 is executed (Yes in S213), the processing in S214 is subsequently performed. On the other hand, when the guidance display is not displayed (No in S213), the CPU 101 subsequently performs the processing in S215. In S214, the CPU 101 stops the display of the guidance display, and subsequently performs the processing in S215.

Figure 3C:
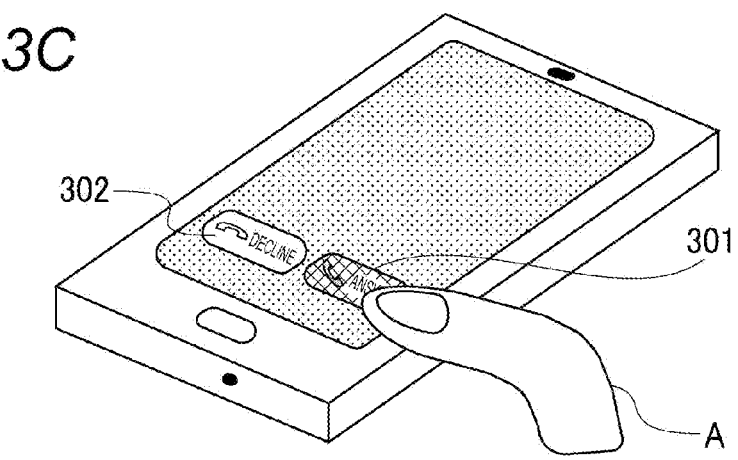

FIG. 3C is a figure illustrating a display example of an incoming call screen 300 after the operation element A moves to the answer button 301 from the state of FIG. 3B. When the operation element A moves to the answer button 301, the display of the guidance displays 311, 312 is stopped. Further, the contacted button (answer button 301) is displayed in a display mode capable of indicating selection.

In S215, the CPU 101 detects whether the not-touched state is detected or not. When the CPU 101 detects the not-touched state (Yes in S215), the CPU 101 subsequently performs the processing in S218. On the other hand, when the CPU 101 does not detect the not-touched state (No in S215), the CPU 101 subsequently performs the processing in S216. In S216, the CPU 101 determines whether the event of the incoming call is stopped or not. When the CPU 101 determines that the incoming call is stopped (Yes in S216), the CPU 101 subsequently performs the processing in S217. In S217, the CPU 101 displays a missed incoming call screen on the display 105, and terminates the processing. On the other hand, when the CPU 101 determines that the incoming call is not stopped (No in S216), the CPU 101 subsequently performs the processing in S209.

On the other hand, in S218, the CPU 101 stops the tactile sensation generated in S210 or S212 (tactile sensation A or tactile sensation B). Subsequently in S219, the CPU 101 stops the guidance display. Subsequently, in S220, the CPU 101 determines whether the position on the button in the not-touched state detected in S215 is within the button area or not. When the CPU 101 determines that the position in the not-touched state is within the button area (Yes in S220), the CPU 101 subsequently performs the processing in S221. On the other hand, when the CPU 101 determines that the position in the not-touched state is out of the button area (No in S220), the CPU 101 subsequently performs the processing in S202. More specifically, in a case where the incoming call state continues when the CPU 101 detects a change from the contacting state to the not-touched state and accordingly the tactile sensation is stopped (No in S220), the cellular phone 100 according to the present embodiment generates an incoming call sound again (S206), or operates the vibrator (S207). When the CPU 101 determines No in S220 and thereafter returns back to Yes in S205, then the CPU 101 may proceed to S207 to operate the vibrator even if the silent mode setting is not set. This is because, for example, at this occasion, an incoming call is already recognized even by a user who does not set the silent mode because it is difficult for the user who is walking to notice the notification of the vibration generated by the vibrator, and therefore, it is not necessary to generate any sound, so that this can prevent people around the user from hearing an annoying sound.

In S221, the CPU 101 executes an action allocated to a button corresponding to the position in the not-touched state, and thereafter terminates the processing. For example, when the operation element is released and becomes not-touched state when it is on the answer button 301, the CPU 101 starts the call processing. On the other hand, when the operation element is released and becomes not-touched state when it is on the decline button 302, the CPU 101 declines the incoming call and cuts off communication.

As described above, when the cellular phone 100 according to the present embodiment detects contact of the operation element but there is not instruction input given by the user who presses down the button, the cellular phone 100 determines No in S220, and proceeds to the processing in S202. Therefore, the user once performs the contact operation and moves to a location where the user does not bother other people, and selects the answer button 301 again at the location to which the user moved, so that the user can give an instruction for starting a call and the like.

As described above, when the cellular phone 100 according to the present embodiment detects a contact by the user while, e.g., a sound for notifying an occurrence of an event such as an incoming call is output, the notification method is changed from, e.g., the output of a sound to the generation of a tactile sensation which is to be given to the user.

Therefore, the cellular phone 100 can avoid operation that is annoying to people around the user, such as generation of an incoming call sound and generation of a sound of vibration, in a quiet place. Further, the cellular phone 100 can continue an event notification such as an incoming call by using a tactile sensation for the user.

When the user releases the operation element to change to the not-touched state in an area other than the button, the cellular phone 100 can return the notification method from generation of the tactile sensation back to, e.g., the output of a sound.

In a first modification of the present embodiment, a case where an event of an incoming call occurs is explained as an example, but the type of event is not limited to the embodiment. Examples of events include not only an incoming call of a call request but also an incoming call of a mail or a message and an alarm such as an alarm clock.

In a second modification, the cellular phone 100 according to the present embodiment changes the type of the tactile sensation in accordance with whether the contacting position is within the button area or not, but instead of this, the same tactile sensation may be given in any of the cases.

In a third modification, it is assumed that a contact operation is performed with still another operation element while the cellular phone 100 stops, e.g., the output of the incoming call sound in accordance with the contact operation. In this case, the cellular phone 100 detects multi-touch operation. Then, when the cellular phone 100 detects multi-touch operation, the cellular phone 100 may return the notification method from the generation of a vibration back to, e.g., the output of an incoming call sound. Therefore, this can prevent the incoming call sound and the like from being suppressed because of unintended contact to the cellular phone 100, and prevents the user from not noticing the incoming call.

In a fourth modification, the cellular phone 100 may further include a light emission unit such as an LED (not shown). In this case, the cellular phone 100 uses a light emission unit to start light emission (light emission processing) during an occurrence of an event of an incoming call, and when a contact is detected, the light emission is stopped.

As described above, according to each of the embodiments explained above, an event can be reliably notified to a user without annoying people around the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-045524, filed Mar. 7, 2014, which is hereby incorporated by reference herein in its entirety.

What is claimed is:

1. A portable apparatus comprising:
a first notification unit configured to notify a user of an event by a first method that gives a tactile sensation to an operation element via a touch panel;
a second notification unit configured to notify the user of the event in accordance with a second method that is different from the first method used by the first notification unit;
a processor; and
a memory having stored thereon instructions that when executed by the processor, cause the processor to:
determine whether there occurs an event of which a user is to be notified, and
control the first notification unit and the second notification unit to give a notification,
wherein, in a case where the touch panel is in a contact state when the event occurs, the first notification unit is controlled to give a notification, and
wherein, in a case where the touch panel is in a not-touched state when the event occurs, the second notification unit is controlled to give a notification.

2. The portable apparatus according to claim 1, wherein, when there is a change from the contact state to the not-touched state when the first notification unit gives the tactile sensation, the control unit switches from a notification using the first notification unit to a notification using the second notification unit.

3. The portable apparatus according to claim 1 wherein the first notification unit uses a button displayed on a display screen corresponding to the touch panel to give a tactile sensation for guiding the operation element to the button based on a button position of the button receiving an instruction in response to the event and a touch position where a contact is made on the touch panel.

4. The portable apparatus according to claim 3, wherein the first notification unit gives a tactile sensation for guiding the operation element to the button by controlling at least one of an intensity of the tactile sensation and a type of the tactile sensation based on the button position and the touch position.

5. The portable apparatus according to claim 3 further comprising a display unit configured to display a guidance display for guiding the operation element to the button based on the button position and the touch position.

6. The portable apparatus according to claim 1,
wherein, when a touch position contacted is within a button area of a button displayed on a display screen and receiving an instruction for the event, the first notification unit gives a first tactile sensation, and
wherein, when the touch position is out of the button area, the first notification unit gives a second tactile sensation that is different from the first tactile sensation.

7. The portable apparatus according to claim 1, wherein, when a multi-touch is detected in a case where the event occurs, the control unit performs control to cause the first notification unit to give a notification.

8. The portable apparatus according to claim 1, wherein the second notification unit is a sound/speech output unit, a vibration unit, or a light emission unit, and the event is an incoming call of a call request, an incoming call of a message, or an alarm.

9. The portable apparatus according to claim 1, wherein the event is an incoming call of a call request, an incoming call of a message, or an alarm.

10. A control method for a portable apparatus, the control method comprising:
notifying, as a first notification, a user of an event by a first method that gives a tactile sensation to an operation element via a touch panel;
notifying, as a second notification, the user of the event in accordance with a second method that is different from the first method used by the first notification;
determining, using a processor, whether there occurs an event of which a user is to be notified; and
controlling the first notification and the second notification to give a notification,
wherein, in a case where the touch panel is in a contact state when the event occurs, the first notification is controlled to give a notification, and
wherein, in a case where the touch panel is in a not-touched state when the event occurs, the second notification is controlled to give a notification.

11. A non-transitory computer-readable storage medium storing a program to cause a portable apparatus to perform a control method, the control method comprising:
notifying, as a first notification, a user of an event by a first method that gives a tactile sensation to an operation element via a touch panel;
notifying, as a second notification, the user of the event in accordance with a second method that is different from the first method used by the first notification;
determining, using a processor, whether there occurs an event of which a user is to be notified; and
controlling the first notification and the second notification to give a notification,
wherein, in a case where the touch panel is in a contact state when the event occurs, the first notification is controlled to give a notification, and
wherein, in a case where the touch panel is in a not-touched state when the event occurs, the second notification is controlled to give a notification.

* * * * *